(12) United States Patent
Satish et al.

(10) Patent No.: US 11,165,812 B2
(45) Date of Patent: Nov. 2, 2021

(54) CONTAINMENT OF SECURITY THREATS WITHIN A COMPUTING ENVIRONMENT

(71) Applicant: SPLUNK INC., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 237 days.

(21) Appl. No.: 14/675,176

(22) Filed: Mar. 31, 2015

(65) Prior Publication Data

US 2016/0164908 A1 Jun. 9, 2016

Related U.S. Application Data (60) Provisional application No. 62/087,025, filed on Dec. 3, 2014, provisional application No. 62/106,830, filed
(Continued)

(51) Int. Cl.
*H04L 29/06* (2006.01)
*G06F 21/55* (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC ............ H04L 63/1441; H04L 63/1433; H04L 63/0236; H04L 63/1425; H04L 63/20;
(Continued)

(56) References Cited

U.S. PATENT DOCUMENTS 6,405,318 B1 6/2002 Rowland
7,076,803 B2 7/2006 Bruton et al.
(Continued)

OTHER PUBLICATIONS

Tejay, Gurvirender P.S.; Zadig, Sean M.; "Investigating the Effectiveness of IS Security Countermeasures Towards Cyber Attacker Deterrence", 45th Hawaii International Conference on System Sciences, IEEE, Jan. 4-7, 2012, pp. 3051-3060.*
(Continued)

*Primary Examiner* — Victor Lesniewski
(74) *Attorney, Agent, or Firm* — Nicholson De Vos Webster & Elliott LLP (57) ABSTRACT

Systems, methods, and software described herein provide for identifying and implementing security actions within a computing environment. In one example, a method of operating an advisement system to provide security actions in a computing environment includes identifying communication interactions between a plurality of computing assets and, after identifying the communication interactions, identifying a security incident in a first computing asset. The method further provides identifying at least one related computing asset to the first asset based on the communication interactions, and determining the security actions to be taken in the first computing asset and the related computing asset.

15 Claims, 5 Drawing Sheets

Related U.S. Application Data on Jan. 23, 2015, provisional application No. 62/106,837, filed on Jan. 23, 2015.

(51) Int. Cl.
*G06F 16/28* (2019.01)
*H04L 12/851* (2013.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
CPC ............ H04L 63/1416; H04L 47/2425; G06F 21/554; G06F 16/285
See application file for complete search history.

(56) References Cited

U.S. PATENT DOCUMENTS

| | | | |
|---|---|---|---|
| 7,127,743 B1 | 10/2006 | Khanolkar et al. | |
| 7,174,566 B2 | 2/2007 | Satyendra | |
| 7,469,301 B2 | 12/2008 | Daniell et al. | |
| 7,617,533 B1* | 11/2009 | Hernacki | H04L 63/1441 726/22 |
| 7,900,259 B2 | 3/2011 | Jeschke et al. | |
| 7,950,056 B1 | 5/2011 | Satish et al. | |
| 8,042,171 B1* | 10/2011 | Nordstrom | H04L 63/1441 726/13 |
| 8,103,875 B1 | 1/2012 | Ramzan et al. | |
| 8,146,147 B2 | 3/2012 | Litvin et al. | |
| 8,185,953 B2 | 5/2012 | Rothstein et al. | |
| 8,261,317 B2 | 9/2012 | Litvin et al. | |
| 8,271,642 B1* | 9/2012 | Sankararaman | G06F 21/554 709/224 |
| 8,291,495 B1 | 10/2012 | Burns et al. | |
| 8,380,828 B1* | 2/2013 | Schlichter | H04L 63/1441 709/221 |
| 8,402,540 B2 | 3/2013 | Kapoor et al. | |
| 8,484,338 B2 | 7/2013 | Paster | |
| 8,516,575 B2 | 8/2013 | Burnside et al. | |
| 8,627,466 B2* | 1/2014 | Fisher | G06F 21/554 726/22 |
| 8,676,970 B2 | 3/2014 | Boyns et al. | |
| 8,756,697 B2 | 6/2014 | Ocepek et al. | |
| 8,856,910 B1* | 10/2014 | Rostami-Hesarsorkh | H04L 63/1408 713/153 |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 8,955,107 B2 | 2/2015 | Hatem | |
| 9,009,814 B1 | 4/2015 | Wertz et al. | |
| 9,009,824 B1 | 4/2015 | Chen et al. | |
| 9,049,226 B1* | 6/2015 | Duane | H04L 63/1441 |
| 9,166,995 B1* | 10/2015 | Roundy | H04L 63/1441 |
| 9,231,964 B2 | 1/2016 | Cross et al. | |
| 9,256,739 B1* | 2/2016 | Roundy | G06F 21/554 |
| 9,306,965 B1* | 4/2016 | Grossman | H04L 63/1425 |
| 9,311,479 B1 | 4/2016 | Manni et al. | |
| 9,313,211 B1* | 4/2016 | Lototskiy | G06F 21/554 |
| 9,325,733 B1* | 4/2016 | Kolman | H04L 63/1416 |
| 9,336,385 B1* | 5/2016 | Spencer | G06F 21/56 |
| 9,338,181 B1 | 5/2016 | Burns et al. | |
| 9,344,445 B2 | 5/2016 | Burns et al. | |
| 9,378,361 B1 | 6/2016 | Yen et al. | |
| 9,396,592 B2 | 7/2016 | Chapman et al. | |
| 9,489,516 B1* | 11/2016 | Lu | G06F 21/566 |
| 9,712,555 B2 | 7/2017 | Satish et al. | |
| 9,729,572 B1 | 8/2017 | Adams et al. | |
| 9,762,607 B2 | 9/2017 | Satish et al. | |
| 9,871,818 B2 | 1/2018 | Satish et al. | |
| 9,954,888 B2 | 4/2018 | Satish et al. | |
| 10,158,663 B2 | 12/2018 | Satish et al. | |
| 10,257,227 B1 | 4/2019 | Stickle et al. | |
| 10,425,440 B2 | 9/2019 | Satish et al. | |
| 10,425,441 B2 | 9/2019 | Satish et al. | |
| 10,476,905 B2 | 11/2019 | Satish et al. | |
| 2004/0003286 A1* | 1/2004 | Kaler | G06F 21/554 726/25 |
| 2004/0054498 A1 | 3/2004 | Shipp | |
| 2004/0111637 A1* | 6/2004 | Baffes | G06F 21/316 726/23 |
| 2004/0250133 A1* | 12/2004 | Lim | G06F 21/554 726/23 |
| 2005/0055578 A1* | 3/2005 | Wright | G06F 21/32 726/4 |
| 2005/0235360 A1 | 10/2005 | Pearson | |
| 2005/0273857 A1 | 12/2005 | Freund | |
| 2006/0048209 A1* | 3/2006 | Shelest | G06F 21/554 726/1 |
| 2006/0059568 A1* | 3/2006 | Smith-Mickelson | H04L 43/00 726/27 |
| 2006/0095965 A1* | 5/2006 | Phillips | H04L 63/1441 726/22 |
| 2006/0117386 A1 | 6/2006 | Gupta et al. | |
| 2006/0174342 A1* | 8/2006 | Zaheer | H04L 63/1441 726/23 |
| 2007/0168874 A1 | 7/2007 | Kloeffer et al. | |
| 2008/0005782 A1 | 1/2008 | Aziz | |
| 2008/0082662 A1 | 4/2008 | Dandliker et al. | |
| 2008/0289028 A1* | 11/2008 | Jansen | H04L 63/0281 726/11 |
| 2009/0037548 A1 | 2/2009 | Ordille et al. | |
| 2010/0100962 A1* | 4/2010 | Boren | H04L 63/1433 726/25 |
| 2010/0162347 A1 | 6/2010 | Barile | |
| 2010/0169973 A1 | 7/2010 | Kim et al. | |
| 2010/0251329 A1 | 9/2010 | Wei | |
| 2010/0319004 A1 | 12/2010 | Hudson | |
| 2010/0319069 A1* | 12/2010 | Granstedt | H04L 63/0263 726/22 |
| 2010/0325412 A1 | 12/2010 | Norrman et al. | |
| 2010/0325685 A1 | 12/2010 | Sanbower | |
| 2011/0161452 A1* | 6/2011 | Poornachandran | H04W 12/1208 709/207 |
| 2012/0210434 A1 | 8/2012 | Curtis et al. | |
| 2012/0224057 A1 | 9/2012 | Gill et al. | |
| 2012/0331553 A1 | 12/2012 | Aziz et al. | |
| 2013/0007882 A1 | 1/2013 | Devarajan et al. | |
| 2013/0081141 A1* | 3/2013 | Anurag | G06F 21/55 726/23 |
| 2013/0291106 A1* | 10/2013 | Simonoff | G06F 21/552 726/23 |
| 2013/0298230 A1* | 11/2013 | Kumar | H04L 63/1425 726/22 |
| 2013/0312092 A1 | 11/2013 | Parker | |
| 2014/0082726 A1 | 3/2014 | Dreller et al. | |
| 2014/0089039 A1* | 3/2014 | McClellan | G06Q 10/0635 705/7.28 |
| 2014/0137257 A1 | 5/2014 | Martinez et al. | |
| 2014/0165200 A1 | 6/2014 | Anurag | |
| 2014/0165207 A1 | 6/2014 | Engel | |
| 2014/0199663 A1 | 7/2014 | Sadeh-Koniecpol et al. | |
| 2014/0237599 A1 | 8/2014 | Gertner | |
| 2014/0259170 A1* | 9/2014 | Amsler | H04L 63/20 726/23 |
| 2014/0283049 A1* | 9/2014 | Shnowske | H04L 63/1408 726/23 |
| 2014/0310811 A1* | 10/2014 | Hentunen | H04L 63/1441 726/23 |
| 2014/0344926 A1* | 11/2014 | Cunningham | H04L 63/1441 726/22 |
| 2014/0351441 A1 | 11/2014 | Madani et al. | |
| 2014/0351940 A1 | 11/2014 | Loder et al. | |
| 2015/0040217 A1 | 2/2015 | Abuelsaad et al. | |
| 2015/0215325 A1 | 7/2015 | Ogawa | |

(56) References Cited

U.S. PATENT DOCUMENTS

| | | | |
|---|---|---|---|
| 2015/0222647 A1* | 8/2015 | Lietz | H04L 63/1416 726/23 |
| 2015/0304169 A1 | 10/2015 | Milman et al. | |
| 2015/0334132 A1 | 11/2015 | Zombik et al. | |
| 2015/0341384 A1 | 11/2015 | Mandayam et al. | |
| 2015/0347751 A1 | 12/2015 | Card et al. | |
| 2015/0365438 A1* | 12/2015 | Carver | H04L 63/1441 726/1 |
| 2015/0381641 A1 | 12/2015 | Cabrera et al. | |
| 2015/0381649 A1 | 12/2015 | Schultz et al. | |
| 2016/0006749 A1 | 1/2016 | Cohen et al. | |
| 2016/0065608 A1 | 3/2016 | Futty | |
| 2016/0072836 A1* | 3/2016 | Hadden | H04L 63/1441 726/23 |
| 2016/0103992 A1* | 4/2016 | Roundy | G06F 21/554 726/23 |
| 2016/0119379 A1 | 4/2016 | Nadkarni | |
| 2016/0164893 A1 | 6/2016 | Levi | |
| 2016/0241580 A1 | 8/2016 | Watters et al. | |
| 2016/0241581 A1 | 8/2016 | Watters et al. | |
| 2017/0237762 A1 | 8/2017 | Ogawa | |

OTHER PUBLICATIONS

Hasegawa, Hirokazu; Yamaguchi, Yukiko; Shimada, Hajime; Takakura; Hiroki; "A Countermeasure Recommendation System against Targeted Attacks with Preserving Continuity of Internal Networks", 38th Annual Computer Software and Applications Conference, IEEE, Jul. 21-25, 2014, pp. 400-405.*

Hershey, Paul C., Ph.D.; Silio, Jr., Charles B., Ph.D.; "Procedure for Detection of and Response to Distributed Denial of Service Cyber Attacks on Complex Enterprise Systems", International Systems Conference SysCon, IEEE, Mar. 19-22, 2012, 6 pages.*

Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.

Non Final Office Action for U.S. Appl. No. 14/677,493, dated Aug. 24, 2017, 31 pages.

Notice of Allowance, U.S. Appl. No. 16/182,914, dated Dec. 4, 2019, 5 pages.

Final Office Action from U.S. Appl. No. 14/674,679, dated Sep. 22, 2016, 19 pages.

Final Office Action from U.S. Appl. No. 14/677,493, dated Nov. 13, 2018, 20 pages.

Final Office Action from U.S. Appl. No. 14/824,262, dated Apr. 6, 2017, 22 pages.

Final Office Action from U.S. Appl. No. 14/868,553, dated Oct. 15, 2018, 19 pages.

Final Office Action from U.S. Appl. No. 14/868,553, dated Oct. 18, 2017, 19 pages.

Final Office Action from U.S. Appl. No. 14/956,589, dated Nov. 22, 2017, 27 pages.

Final Office Action from U.S. Appl. No. 15/924,759, dated Aug. 1, 2018, 13 pages.

Final Office Action from U.S. Appl. No. 16/107,979, dated Jun. 13, 2019, 14 pages.

Final Office Action from U.S. Appl. No. 14/677,493, dated Nov. 25, 2016, 23 pages.

Final Office Action received for U.S. Appl. No. 16/182,914, dated Sep. 18, 2019, 6 pages.

Final Office Action, U.S. Appl. No. 14/677,493, dated Jan. 16, 2020, 16 pages.

Non-Final Office Action from U.S. Appl. No. 15/886,183, dated Mar. 22, 2018, 21 pages.

Non-Final Office Action from U.S. Appl. No. 16/107,972, dated Dec. 31, 2018, 11 pages.

Non-Final Office Action from U.S. Appl. No. 16/142,913, dated Apr. 30, 2019, 33 pages.

Non-Final Office Action from U.S. Appl. No. 14/674,679, dated Jun. 2, 2016, 16 pages.

Non-Final Office Action from U.S. Appl. No. 14/675,075, dated Jul. 11, 2016, 13 pages.

Non-Final Office Action from U.S. Appl. No. 14/677,493, dated Aug. 2, 2019, 26 pages.

Non-Final Office Action from U.S. Appl. No. 14/677,493, dated Jul. 11, 2016, 17 pages.

Non-Final Office Action from U.S. Appl. No. 14/677,493, dated May 1, 2017, 25 pages.

Non-Final Office Action from U.S. Appl. No. 14/677,493, dated May 14, 2018, 23 pages.

Non-Final Office Action from U.S. Appl. No. 14/689,926, dated May 8, 2017, 34 pages.

Non-Final Office Action from U.S. Appl. No. 14/689,973, dated Jan. 25, 2017, 18 pages.

Non-Final Office Action from U.S. Appl. No. 14/824,262, dated Jul. 13, 2017, 20 pages.

Non-Final Office Action from U.S. Appl. No. 14/824,262, dated Oct. 7, 2016, 16 pages.

Non-Final Office Action from U.S. Appl. No. 14/868,553, dated Mar. 26, 2018, 22 pages.

Non-Final Office Action from U.S. Appl. No. 14/868,553, dated May 26, 2017, 16 pages.

Non-Final Office Action from U.S. Appl. No. 14/956,589, dated May 31, 2017, 33 pages.

Non-Final Office Action from U.S. Appl. No. 14/956,615, dated Jul. 28, 2017, 46 pages.

Non-Final Office Action from U.S. Appl. No. 15/699,454, dated Feb. 8, 2018, 19 pages.

Non-Final Office Action from U.S. Appl. No. 15/845,963, dated Feb. 12, 2018, 27 pages.

Non-Final Office Action from U.S. Appl. No. 15/924,759, dated Feb. 26, 2019, 20 pages.

Non-Final Office Action from U.S. Appl. No. 16/107,975, dated Jan. 4, 2019, 11 pages.

Non-Final Office Action from U.S. Appl. No. 16/107,979, dated Oct. 18, 2018, 14 pages.

Non-Final Office Action from U.S. Appl. No. 16/182,914, dated May 30, 2019, 23 pages.

Non-Final Office Action, U.S. Appl. No. 16/042,283, dated Jan. 24, 2020, 25 pages.

Non-Final Office Action, U.S. Appl. No., dated Mar. 19, 2020, 18 pages.

Notice of Allowance from U.S. Appl. No. 14/674,679, dated Apr. 18, 2017, 20 pages.

Notice of Allowance from U.S. Appl. No. 14/689,926, dated Nov. 8, 2017, 22 pages.

Notice of Allowance from U.S. Appl. No. 14/689,973, dated Jul. 27, 2017, 33 pages.

Notice of Allowance from U.S. Appl. No. 14/824,262, dated Nov. 22, 2017, 7 pages.

Notice of Allowance from U.S. Appl. No. 14/956,589, dated Apr. 23, 2018, 21 pages.

Notice of Allowance from U.S. Appl. No. 14/956,615, dated Dec. 18, 2017, 19 pages.

Notice of Allowance from U.S. Appl. No. 15/699,454, dated Aug. 9, 2018, 11 pages.

Notice of Allowance from U.S. Appl. No. 15/845,963, dated Jun. 26, 2018, 11 pages.

Notice of Allowance from U.S. Appl. No. 15/886,183, dated Sep. 19, 2018, 9 pages.

Notice of Allowance from U.S. Appl. No. 15/924,759, dated Jun. 13, 2019, 21 pages.

Notice of Allowance from U.S. Appl. No. 16/107,972, dated May 9, 2019, 18 pages.

Notice of Allowance from U.S. Appl. No. 16/107,975, dated May 13, 2019, 18 pages.

(56) References Cited

OTHER PUBLICATIONS

Notice of Allowance from U.S. Appl. No. 16/142,913, dated Aug. 30, 2019, 21 pages.
Notice of Allowance received for U.S. Appl. No. 16/107,979, dated Oct. 7, 2019, 14 pages.
Final Office Action, U.S. Appl. No. 16/568,949, dated Oct. 28, 2020, 19 pages.
Non-Final Office Action, U.S. Appl. No. 14/677,493, dated Jul. 14, 2020, 18 pages.
Non-Final Office Action, U.S. Appl. No. 16/539,918, dated Jul. 16, 2020, 14 pages.
Non-Final Office Action, U.S. Appl. No. 16/736,120, dated Sep. 22, 2020, 14 pages.
Notice of Allowance, U.S. Appl. No. 14/868,553, dated Jun. 26, 2020, 8 pages.
Notice of Allowance, U.S. Appl. No. 16/042,283, dated Jul. 28, 2020, 17 pages.
Final Office Action, U.S. Appl. No. 16/736,120, dated Jan. 6, 2021, 15 pages.
Non-Final Office Action, U.S. Appl. No. 16/699,299, dated Apr. 29, 2021, 10 pages.
Notice of Allowance, U.S. Appl. No. 14/677,493, dated Jan. 22, 2021, 6 pages.

\* cited by examiner

CONTAINMENT OF SECURITY THREATS WITHIN A COMPUTING ENVIRONMENT

TECHNICAL FIELD

This application is related to and claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, and which are hereby incorporated by reference in their entirety.

TECHNICAL FIELD

Aspects of the disclosure are related to computing environment security, and in particular to implementing security actions in a plurality of computing assets to contain a security threat.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide real-time analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs generate security alerts for devices within the network, administrators may be forced to translate each of these alerts into particular actions. Thus, time and resources that could be used on other tasks may be used in researching and determining an appropriate course of action to handle a security threat. Further, difficulties may arise when administrators attempt to contain a security threat as systems and components within the environment often communicate to provide desired operations.

OVERVIEW

The technology disclosed herein enhances the ability to provide actions to multiple computing assets within a computing environment. In one example, a method of operating an advisement system to provide security actions to multiple assets includes identifying communication interactions for a plurality of computing assets in a computing environment. The method further provides, identifying a security incident in a first computing asset, and identifying one or more related computing assets to the first computing asset based on the communication interactions. The method also includes determining security actions to be taken against the security incident in the first computing asset and the one or more related computing assets.

In some implementations, to determine the security actions, the method may include obtaining enrichment information for the security incident from one or more sources, and identifying a rule set based at least on the enrichment information. From the rule set, actions may be identified that are associated with the rule set.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The various examples disclosed herein provide for containing security threats within a computing environment by implementing security actions across a plurality of network assets. In many organizations, security systems, such as security information and event management (SIEM) systems provide real-time analysis of security alerts generated by network hardware and processes. The network hardware and processes may include routers, firewalls, operating systems and applications executing on one or more computing devices, switches, or intrusion detection systems, amongst a variety of other network devices and processes. During the analysis of the particular network, a SIEM system may identify an issue, and flag the issue as a possible security threat. Once flagged, the SIEM system may provide information to an administrator, or store information about the threat to be analyzed for a possible solution.

Here, in addition to the operations provided by the SIEM system or other security monitoring systems within a computing environment, an advisement system may be used to identify, implement, and recommend security actions to be taken against security threats. For example, if a SIEM system identified a possible security threat within an asset of a computing environment, information about the threat could be transferred to the advisement system, supplementary information about the threat could be identified, and actions could be taken against the threat based on a preconfigured rule set. These actions may include a variety or procedures that eliminate, segregate, monitor, or provide other similar actions on the identified threat. In some examples, the advisement system may be configured to implement a default action without user interaction against the threat. However, in other instances, one or more suggested actions may be provided to an administrator, and the administrator may select the one or more actions to be taken against the security threat. The actions taken may include taking a snapshot of the affected computing asset, segregating the asset from other assets, removing an application related to the incident, blocking a particular internet protocol address related to the incident, or providing any other similar action to protect assets in the environment from the security incident—including combinations thereof.

In some implementations, the security actions for the environment may be directed at multiple computing assets, such as physical or virtual computing systems. For example, a security incident may be identified for a serving computing system, which may include a virus, malware, or some other security incident. Responsive to identifying the incident, the advisement system may determine a security action to limit the spread of the incident to other computing assets within the environment. To accomplish this task, a security action or configuration may be generated for a firewall or other communication management service for the affected system, limiting the affected system from communicating with other computing assets within the environment. In addition to the action for the affected computing system, the advisement system may also identify one or more additional actions that can be implemented in other computing assets as a redundant safeguard to limit the spread of the incident to other systems. Thus, on systems or devices that might communicate with the affected system, actions may be implemented that prevent or limit the communications with the affected computing system. These actions may include making modifications to the firewall for the computing asset, adding an addition to a file hash blacklist for the computing asset, or any other similar operation to prevent the spread of the incident from the affected computing system.

In some examples, the affected computing asset may comprise a service providing system that is required by one or more other assets within the organization. Accordingly, if the affected computing system were segregated from the rest of the computing environment, by for example placing the asset in a virtual local area network (VLAN), the other assets would be unable to provide desired operations. To remedy this issue, the affected computing asset may be prevented from initiating communications with other assets in the computing environment, but the dependent assets may initiate communications with the affected system. Consequently, if the affected computing system comprised a database system required by one or more endpoint assets, the endpoint assets may inquire the database system for data, but the database system would be unable to initiate communications with other assets. By limiting the communication of the affected system, an administrator or some other process may work on eliminating the threat, while maintaining the services required by the organization.

Figure 1:
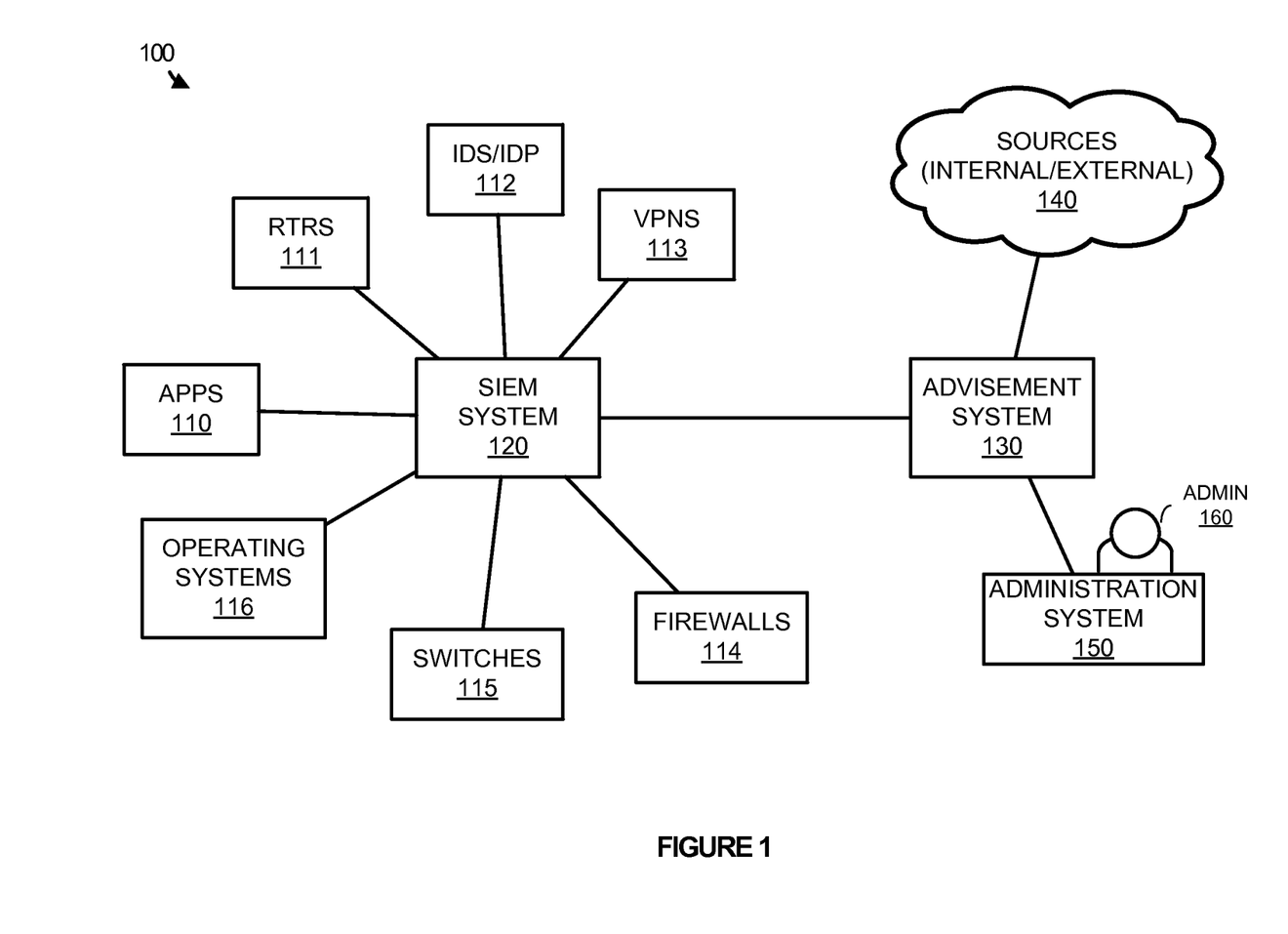
FIG. 1 illustrates a computing environment to manage security actions for a plurality of network assets.

To further illustrate the operation of an advisement system within a computing network, FIG. 1 is provided. FIG. 1 illustrates a computing environment 100 to manage security actions for a plurality of network assets. Computing environment 100 includes computing assets 110-116, SIEM system 120, advisement system 130, sources 140, and administration system 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration system 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration system 150 may comprise an end user device, such as a desktop computer, laptop computer, smartphone, tablet, or any other similar computing device.

Advisement system 130 communicates with SIEM system 120, sources 140, and administration system 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions against the security threat. These actions might include default actions that can be initiated and implemented within the environment without interaction from an administrator, and might further include suggested actions that can be provided to administrator (admin) 160. Once the suggested actions are determined, the suggested actions are transferred, via email, text message, or other similar format, to administration system 150 to be presented to administrator (admin) 160. From the suggested actions, administrator 160 may select a particular action and advisement system 130 may implement the action within the computing environment.

In some implementations, advisement system 130 may use data communication interactions for the computing assets to better identify actions to be taken within the environment. This communication interaction information may include which devices are communicating, how much data is being communicated, how often data is communicated, or any other similar communication interaction information. Based on the information, advisement system 130 may determine which assets are related or relevant to one another, allowing advisement system 130 to implement security actions in both a computing system with the incident, as well as related computing systems in the environment. To define relationships between the assets, advisement system 130 may obtain administrator defined relationship information for the computing assets, or may use agents located in the environment to retrieve communication information and interactions for each of the computing assets.

Figure 2:
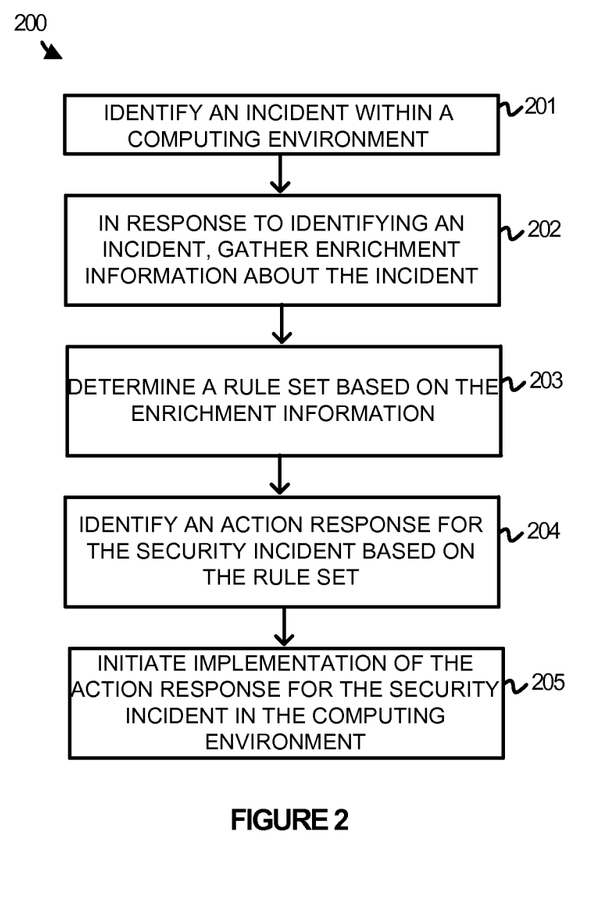
FIG. 2 illustrates a method of operating an advisement system to manage security actions for a plurality of network assets.

To further demonstrate the operation of computing environment 100, FIG. 2 is provided. FIG. 2 illustrates a method 200 of operating advisement system 130 to manage security actions for a plurality of network assets. In particular, as described in FIG. 1, SIEM system 120 receives information from a plurality of network assets 110-116 and identifies security threats to devices and systems based on the information. Once a threat is identified, the threat is then transferred to advisement system 130. Advisement system 130 identifies the security threat or incident within computing environment 100 (201), and in response to identifying the incident, gathers enrichment information about the incident (202). Specifically, advisement system 130 may identify properties or traits of the incident, such as the internet protocol (IP) address for the incident, the firewall involved in the incident, the computing device, the host, the user, any uniform resource locators (URLs) associated with the incident, or any other information specific to the security incident and asset. Once the properties are identified, advisement system 130 may identify information related to the threat using internal and external sources 140. These sources may include databases, websites, or other similar sources that keep track of malicious IP addresses or domain names, the type of threats presented from the particular domain names, identities of malware, Trojans, and viruses, amongst a variety of other information.

Upon identifying enrichment information related to a particular incident, advisement system 130 may determine a rule set based at least on the enrichment information (203). This rule set is related to the type of threat presented to the network and computing environment 100. For example, an unknown process executing on a computing asset may be identified as a security incident. Responsive to identifying the security incident, one or more databases, websites, and other similar sources may be queried to identify information about the process. Based on the result of these queries, a rule set may be identified that corresponds at least to the query results.

In at least one example, rule sets may be stored in one or more data structures, such as arrays, linked lists, or any other similar data structure that can assist in identifying particular rule sets based on enrichment information and, in some examples, the type or criticality the asset. For example, a serving computing system that provides financial data may have a different rule set than an end user computing system with same malware security threat. Similarly, a serving computing system with malware may be associated with a different rule set than a serving computing system being attacked from a remote IP address. To define the criticality of each asset of the environment, an administrator may define a criticality rating for each asset, a criticality rating may be determined based on the user or data accessible by each asset, a criticality rating may be determined based on the number of assets relying on a particular asset, or may be determined by any other similar means. The criticality rating may be any value, score, or other rating system capable of assisting an advisement system in identifying a rule for a security incident.

Once the rule set is determined, the process further includes identifying an action response for the security incident based on the identified rule set (204), and initiating implementation of the action response for the security incident in the computing environment (205). To determine the action response, in some examples, the rule set may be associated with or include a default action to be taken against security incident. This default action may include the necessary procedures to automate the process of implementing the desired action within the computing environment. In other implementations, one or more action recommendations may be provided to an administrator based on the rule set, allowing the administrator to select the one or more actions that they desire. These actions may be provided to the administrator via a user interface on advisement system 130, or may be provided to the administrator at a console device, such as administration system 150.

As described herein, the actions taken in the computing environment may be taken against the affected computing system, as well as other systems that are related to or dependent on the affected computing system. To determine which of the systems are related, advisement system 130 may retrieve connection information for each of the computing assets to determine which systems communicate with each other during normal operation. In addition to or in place of retrieving the connection information during the operation of the assets, an administrator may also define which systems are dependent on one another within the computing environment. For example, an administrator may identify that a plurality of endpoint computing systems are dependent on a serving computing system to provide desired operations.

As a result of mapping the relations and dependencies within the environment, the rule set and corresponding security actions may reflect the actions to be taken throughout the environment. For example, if a malware security incident were identified within a serving computing system, the actions to respond to the incident may include preventing the serving computing system from initiating external connections, and may further include preventing related devices within the environment from communicating with the internet protocol (IP) address of the serving computing system. Thus, rather than relying on the affected computing system to implement a firewall or file hash blacklist, advisement system 130 may implement security configurations in other systems as a failsafe response to the security threat.

In some implementations, a computing asset, such as a serving computer, may be required by other assets to provide operations within the environment. For example, a database system may be required by one or more endpoint systems to provide desired operations. Accordingly, rather than preventing all communications between the affected database system and the endpoint computing systems, actions may be taken that allow the endpoint computing systems to continue to initiate communications with the database system, but prevent the database system from initiating communications of its own. By preventing the communications from the affected database computing system, the threat of the incident spreading to other devices and systems may be limited.

As described above, suggested security actions may be provided to an administrator, such as administrator 160, allowing the administrator to select the particular actions against a security incident. In some examples, once a user selects an action, advisement system 130 may include workflows that direct administrator 160 to implement the desired action within the system. For example, if the administrator selected to implement a firewall configuration, advisement system 130 may provide the administrator with the necessary procedures to implement the desired action in the particular computing system. In the alternative, advisement system 130 may be configured to automate the process of implementing the security actions within the computing environment. Accordingly, upon selection of an action, advisement system 130 may identify the manufacturer of the software and/or hardware of the assets and translate the desired action into the procedures to implement the action in the hardware and/or software.

Although illustrated in FIG. 1 with a SIEM system, it should be understood that in some examples other systems, such as the assets themselves within the computing environment, might be used to identify security threats. Further, although illustrated separate in the example of FIG. 1, it should be understood that SIEM system 120 might reside wholly or partially on the same computing systems as advisement system 130.

Figure 3:
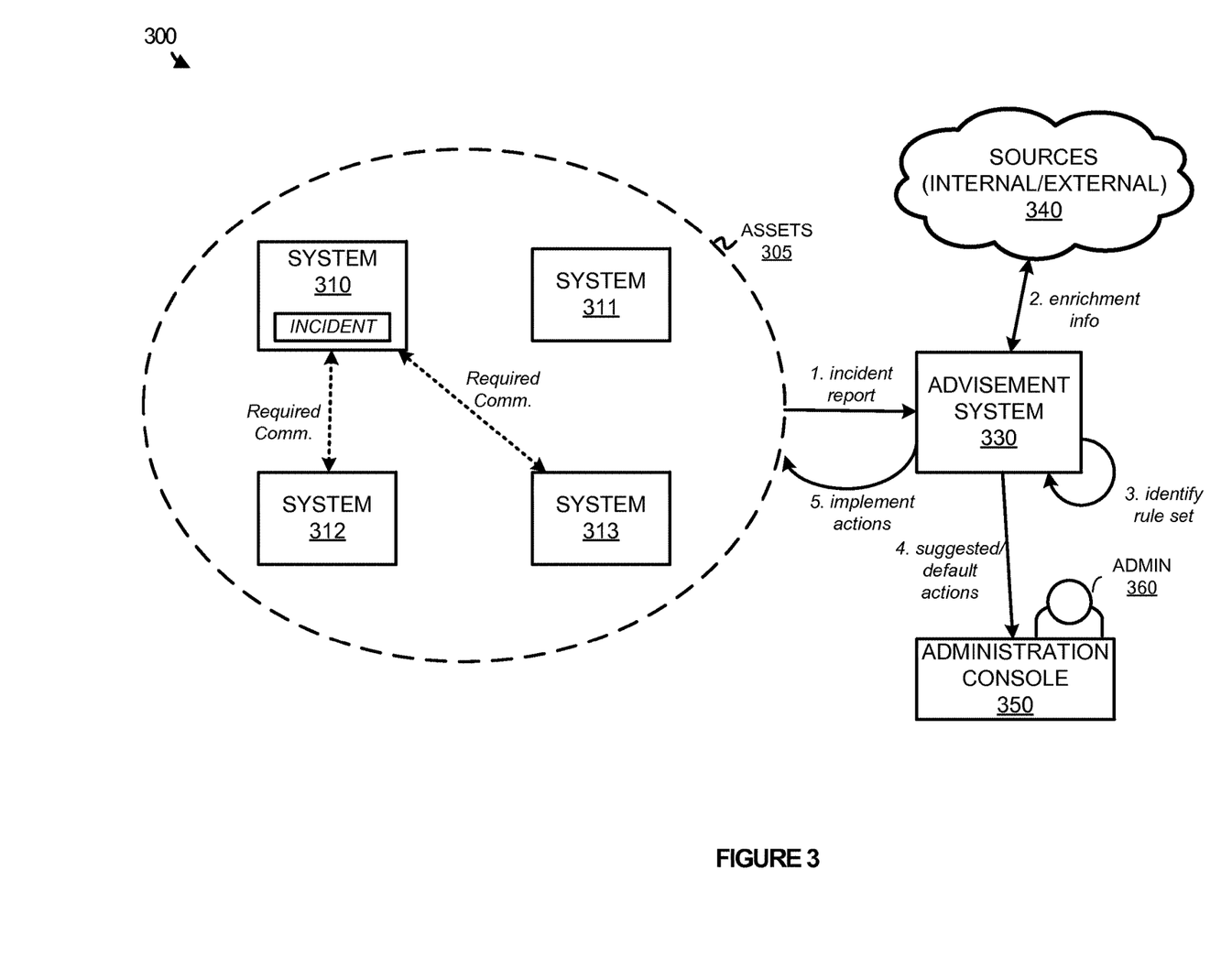
FIG. 3 illustrates an operational scenario of identifying an incident and implementing security actions for the incident.

To further demonstrate the implementation of security actions in multiple assets, FIG. 3 is provided. FIG. 3 illustrates an operational scenario 300 of identifying an incident and implementing security actions for the incident. Operational scenario 300 includes assets 305, advisement system 330, sources (internal and external) 340, and administrator console 350. Assets 305 comprise computing systems 310-313, which may each comprise a physical computing system, such as a desktop or server computing system, or a virtual computing system or virtual machine.

In operation, systems 310-313 provide various operations within the computing environment, and may rely on one another for particular services and operations. For example, as illustrated in FIG. 3, systems 312-313 may require system 310 to provide a particular service, such as a database service, data analysis service, or some other service. Accordingly, even if a security incident is identified for system 310, systems 312-313 may continue to require the service provided by system 310.

As illustrated in FIG. 3, a security incident is identified within asset 310, and information about the incident is provided to advisement system 330. This incident may be reported via a SIEM system, an agent on system 310, or by another security process or system within the computing environment. Responsive to receiving the incident report, advisement system 330 gathers enrichment information about the report from sources 340, and identifies a rule set based on the enrichment information. For example, if an unknown process were executing on system 310, advisement system 310 may inquire one or more databases to determine if the unknown process is malicious. Based on the responses to the inquiry, advisement system 330 may determine a rule set for the incident.

In some examples, one or more data structures, such as arrays, trees, or other similar data structures may be used to identify the appropriate rule set for the incident. These data structures may assist advisement system 330 in determining a rule set based on the enrichment information gathered and, in some examples, the type or criticality of the asset affected by the security incident. For example, enrichment information that indicates that a process is not harmful will not be associated with the same rule set as enrichment information that indicates that a process is malicious. Similarly, a rule set may be different for an individual user's computing system in comparison to a server that is accessible by a plurality of users, even if the systems are affect by the same malicious process.

Once the rule set is identified, actions are identified to counter the identified incident. In some examples, to identify the actions, default actions will be associated with a rule set, which can be implemented within the computing environment. In other examples, in addition to or in place of the default action, one or more action suggestions based on the rule set may be provided to an administrator, and the administrator may select one or more of the actions to be implemented within the environment.

As described herein, the actions defined by the administrator are not only implemented within the computing asset with the incident, but also with other computing assets related to the affected computing asset. To determine the relationship between assets, in some examples, reports about data connections by systems 310-313 may be reported back to advisement system 330 to identify the communication interactions made by the systems during normal operation. As a result, using the present example, the reports would indicate that system 310 is required as a service by systems 312-313. In some implementations, in addition to or in place of generating reports for advisement system 330, an administrator may define the communication interactions required by the systems during normal operation. Thus, an administrator may define that system 310 is required by systems 312-313 for operation.

Based on the defined interactions, actions may be identified for computing systems that are separate and distinct from the computing system with the incident. Referring again to FIG. 3, the actions identified and implemented for assets 305 may include actions for system 310, as well as systems 312-313, which communicate with system 310.

In one example, the incident in system 310 may comprise a malicious process. To prevent the spread of the process, an action may be implemented by advisement system 330 to prevent all external communication requests by system 310. This action may be implemented in a firewall or other similar communication control processes to segregate system 310 from the other systems and devices in the network. Although an attempt will be made to segregate system 310 from other systems in the network, advisement system 330 may also direct other actions to prevent other systems contacting or communicating with the IP address associated with system 310. Accordingly, even if the action applied to system 310 does not prevent system 310 from attempting to communicate with other systems in the network, the actions on the other systems may provide a failsafe to prevent the spread of the incident on system 310.

In some examples, the actions may be implemented in systems known to communicate with system 310, such as systems 312-313. However, in other instances, advisement system 330 may implement actions in all computing systems within the environment capable of communicating with system 310, as the communications of system 310 may be unpredictable upon the occurrence of the incident.

In some implementations, such as that illustrated in FIG. 3, one or more systems may continue to require access to the services provided by a system that has encountered a security incident. For example, system 310 may include a database service that provides data to systems 312-313. Accordingly, rather than completely separating system 310 from the network, systems 312-313 may continue to request data from system 310, while system 310 may be prevented from initiating communications with other systems in the network. Further, to prevent the transfer of unwanted files and processes, file hash blacklists may be maintained on systems 312-313 to prevent the transfer of data associated with incident 310.

Figure 4:
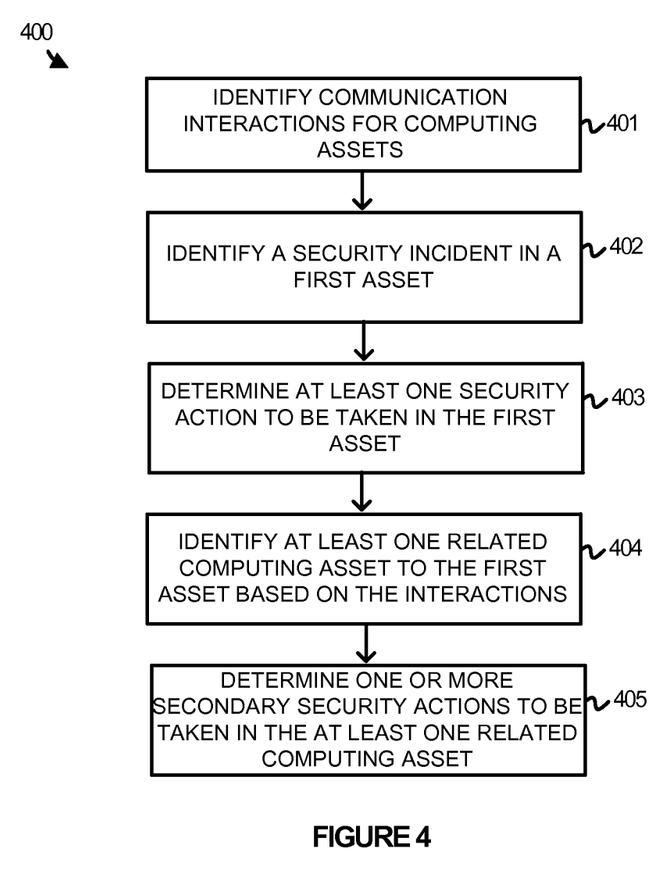
FIG. 4 illustrates a method of operating an advisement system to provide security actions in a computing environment.

Referring now to FIG. 4, FIG. 4 illustrates a method 400 of operating an advisement system to provide security actions in a computing environment. As described herein, it may be beneficial to implement security actions in multiple assets to prevent the spread or infection of multiple computing assets within an organization's computing environment. To manage the application and implementation of security actions, an advisement system, such advisement system 130 from FIG. 1 or advisement system 330 from FIG. 3, identifies communication interactions for a plurality of computing assets in the computing environment (401). In some implementations, the interactions may be defined based on communication reports for the environment, which may include information about the assets involved in each communication, the amount of data communicated per communication, the frequency of the communications, or any other similar communication data. The reports may be retrieved directly from each computing system via agents on the systems, or may be retrieved from systems external to the assets configured to monitor the communications in the network. In some examples, in addition to or in place of the reports received from the data, an administrator may configure the communication interactions that occur during normal operation of the environment. For example, the administrator may dictate that one or more end point devices communicate with a server to retrieve data during normal operation.

Once the communication interactions are defined for the environment, the advisement system may identify a security incident for a first asset in the plurality of assets (402). This incident may include a malware application, a virus, an attempted unauthorized access by an external IP address, or some other security incident. In response to identifying the security incident, the advisement system may determine at least one security action to be taken against the incident in the first asset (403). In some examples, the action may comprise a default action identified based on enrichment data gathered about the incident. In other instances, the action may comprise an administrator-defined action from a list of one or more actions supplied to an administrator of the computing environment. This list of actions may be supplied based on a rule set identified using enrichment data gathered from internal and external sources.

In addition to taking action in the affected asset, the advisement system is further configured to identify at least one related computing asset to the first computing asset based on the communication interactions (404). These related computing assets may include any computing system within the network with the ability to communicate with the affected system, any computing system that has communicated with the affected computing system prior to the identification of the incident, or any other similar relations between the computing assets. Once the related computing assets are identified, the advisement system may determine one or more secondary actions to be taken in the related computing assets (405).

In some examples, the actions may be used to prevent future communications with the asset associated with the incident. Accordingly, in addition to implementing an action in the first asset, additional actions may be implemented in the related assets to further ensure that the assets do not communicate with the infected system. In some implementations, either based on the communication reports or administrator definitions, at least a portion of related assets may be defined as dependent on the first asset with the security incident. Consequently, rather than preventing the dependent systems from accessing the necessary processes and data from the affected system, the affected system may be prevented from initializing outbound communications, while the dependent devices may continue to request the necessary data and processes. Further, in addition to or in place of the communication prevention mechanisms, file blacklists may be implemented on one or more of the devices in the computing environment to prevent malicious or otherwise unwanted files or processes from being transferred from the affected computing system.

Figure 5:
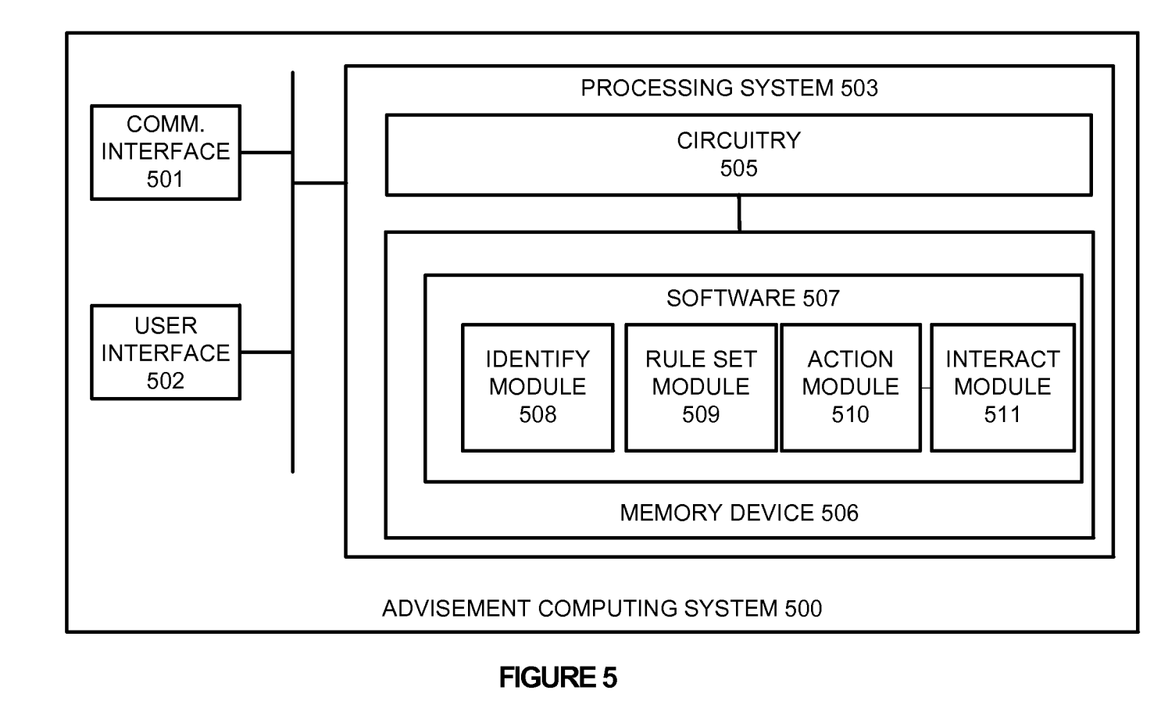
FIG. 5 illustrates an advisement computing system manage security actions for a plurality of network assets.

Turning to FIG. 5, FIG. 5 illustrates an advisement computing system 500 to provide action recommendations for a plurality of network assets. Advisement computing system 500 is representative of a computing system that may be employed in any computing apparatus, system, or device, or collections thereof, to suitably implement the advisement systems described herein. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In particular, communication interface 501 may communicate with a SIEM system or other systems that gather security incident information from a plurality of computing assets within a computing environment. Communication interface 501 may be configured to communicate with one or more administration systems to provide action recommendations to administrators, and may be configured to communicate with the computing assets to implement identified security actions.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identify module 508, rule set module 509, action module 510, and interact module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, interact module 511 is configured to, when executed by processing system 503 and advisement computing system 500, identify communication interactions for a plurality of computing assets within an organization's computing environment. These interactions may be defined based on reports of communication occurring in the environment, or based on user-defined interactions that describe the devices that should be in communication during normal operation. Once the communication interactions are determined, identify module 508 directs processing system 503 to identify a security incident in a first computing asset in the plurality of assets. Upon identifying the security incident, interact module 511 may direct processing system 503 to identify one or more assets that are related to or are capable of communication with the first computing asset. For example, the first asset may be a serving computing system, and the related computing assets may be any device or virtual machine that can access the serving computing system.

Also in response to identifying the incident, advisement computing system 500 is further configured to determine security actions to be taken against the incident in the environment. To accomplish this task, rule set module 509 may direct processing system 503 to query one or more sources to identify enrichment information about the security incident. For example, a website or database may maintain records on known malware that could infect a computing system in the environment. Once the enrichment information is determined, rule set module 509 may further direct processing system 503 to identify a rule set based at least on the enrichment information. Rule set module 509 may further base the rule set on the type or criticality of the computing asset within the environment. For example, rule set module 509 may identify a different rule set for a security incident in a serving computing device as opposed to an end user computing device.

Once a rule set is identified, action module 510 directs processing system 503 to determine security actions to be taken against the incident in the security actions in the computing environment. These actions may include a first set of actions for the computing system affected by the incident, and a second set of actions for the related computing assets. For example, an action for the affected asset may include preventing the affected computing asset from initiating communications with other devices within the organization's environment. Actions for the related assets may include preventing the assets from initiating communications with the affected asset, or allowing the assets that require a service from the affected asset to initiate communications with the affected asset to prevent interruption in the environment. Other actions to be implemented in the affected and related assets may include implementing file hash blacklists to prevent files or processes related to the incident from transferring between devices, blocking specific IP addresses related to the incident, or any other similar action to mitigate the incident in the environment.

In some implementations, the actions to be taken within the environment may comprise preconfigured default actions that are associated with the rule set. In addition to or in place of the default actions, one or more suggested actions may be associated with the rule set and provided to an administrator for selection. Once the administrator selects the actions, the actions may be implemented within the environment.

In some examples, an organization's computing environment may include software and hardware manufactured by a plurality of different vendors. Accordingly, to implement the actions in each of the assets, configurations may be accessible to advisement computing system 500 to implement the action in each version of software or hardware. For example, a set of actions may dictate that an IP address is to be blocked in firewalls for multiple computing devices. Accordingly, advisement computing system 500 may identify the type of firewall in each of the devices, and implement the necessary procedures for each firewall to block the particular IP address.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an advisement system to provide security actions in a computing environment, the method comprising:

in a processing system of the advisement system, obtaining data identifying data connections established among a plurality of computing assets in the computing environment;

generating, based on the data identifying data connections established among the plurality of computing assets, relationship data identifying relationships among the plurality of computing assets in the computing environment, wherein the relationship data includes an indication that a first computing asset provides a service that is used by a second computing asset in the computing environment;

identifying, by the advisement system, a security incident affecting the first computing asset of the plurality of computing assets;

obtaining enrichment information about the security incident from one or more resources;

determining a rule set for the security incident based on the enrichment information;

determining a first security action to be taken against the security incident in the first computing asset based on the rule set;

identifying, by the advisement system and based on the relationship data, the second computing asset that uses the service provided by the first computing asset;

determining a second security action to be taken against the security incident in the second computing asset based on the rule set; and implementing, in the computing environment, the first security action and the second security action, wherein implementation of the first security action and the second security action causes the first computing asset to be prohibited from initiating connections with computing assets in the computing environment and further causes the second computing asset to be permitted to request data from the first computing asset.

2. The method of claim 1 wherein determining the first security action to be taken against the security incident in the first computing asset based on the rule set comprises determining a default security action to be taken against the security incident in the first computing asset based on the rule set and a criticality rating for the first computing asset.

3. The method of claim 1 wherein the one or more resources comprise one or more databases or websites.

4. The method of claim 1 wherein determining the first security action to be taken against the security incident in the first computing asset based on the rule set comprises:
  identifying a suggested security action to be supplied to an administrator based on the rule set and a criticality rating for the first computing asset; and
  identifying a selected security action by the administrator.

5. The method of claim 1 wherein identifying the security incident affecting the first computing asset comprises receiving a notification of the security incident from a security information and event management (SIEM).

6. A non-transitory computer readable storage medium having instructions stored thereon, that when executed by one or more processors, cause the one or more processors to perform operations including:
  obtaining data identifying data connections established among a plurality of computing assets in a computing environment;
  generating, based on the data identifying data connections established among the plurality of computing assets, relationship data identifying relationships among the plurality of computing assets in the computing environment, wherein the relationship data includes an indication that a first computing asset provides a service that is used by a second computing asset in the computing environment;
  identifying, by an advisement system, a security incident affecting a first computing asset of the plurality of computing assets;
  obtaining enrichment information about the security incident from one or more resources;
  determining a rule set for the security incident based on the enrichment information;
  determining a first security action to be taken against the security incident in the first computing asset based on the rule set;
  identifying, by the advisement system and based on the relationship data, the second computing asset that uses the service provided by the first computing asset;
  determining a second security action to be taken against the security incident in the second computing asset based on the rule set; and
  implementing, in the computing environment, the first security action and the second security action, wherein implementation of the first security action and the second security action causes the first computing asset to be prohibited from initiating connections with computing assets in the computing environment and further causes the second computing asset to be permitted to request data from the first computing asset.

7. The non-transitory computer readable storage medium of claim 6, wherein determining the first security action to be taken against the security incident in the first computing asset based on the rule set comprises determining a default security action to be taken against the security incident in the first computing asset based on the rule set and a criticality rating for the first computing asset.

8. The non-transitory computer readable storage medium of claim 6, wherein the one or more resources comprise one or more databases or websites.

9. The non-transitory computer readable storage medium of claim 6, wherein determining the first security action to be taken against the security incident in the first computing asset based on the rule set comprises:
  identifying a suggested security action to be supplied to an administrator based on the rule set and a criticality rating for the first computing asset; and
  identifying a selected security action by the administrator.

10. The non-transitory computer readable storage medium of claim 6, wherein identifying the security incident affecting the first computing asset comprises receiving a notification of the security incident from a security information and event management (SIEM).

11. An apparatus to provide security actions in a computing environment, the apparatus comprising:
  one or more non-transitory computer readable storage media;
  a processing system operatively coupled with the one or more non-transitory computer readable storage media; and
  processing instructions stored on the one or more non-transitory computer readable media that, when executed by the processing system, direct the processing system to at least:
  obtain data identifying data connections established among a plurality of computing assets in the computing environment;
  generate, based on the data identifying data connections established among the plurality of computing assets, relationship data identifying relationships among the plurality of computing assets in the computing environment, wherein the relationship data includes an indication that a first computing asset provides a service that is used by a second computing asset in the computing environment;
  identify a security incident affecting the first computing asset of the plurality of computing assets;
  obtain enrichment information about the security incident from one or more resources;
  determine a rule set for the security incident based on the enrichment information;
  determine a first security action to be taken against the security incident in the first computing asset based on the rule set;
  identify, based on the relationship data, the second computing asset that uses the service provided by the first computing asset;
  determine a second security action to be taken against the security incident in the second computing asset based on the rule set; and
  implement, in the computing environment, the first security action and the second security action, wherein implementation of the first security action and the second security action causes the first computing asset to be prohibited from initiating connections with computing assets in the computing environment and further causes the second computing asset to be permitted to request data from the first computing asset.

12. The apparatus of claim 11 wherein the processing instructions, to obtain enrichment information related to the security incident, direct the processing system to obtain enrichment information from at least one internal or external source related to the security incident.

13. The apparatus of claim 11 wherein the instructions, when executed by the processing system, further direct the processing system to at least: identify a default security action associated with the rule set to be taken against the security incident.

14. The apparatus of claim 11 wherein the plurality of computing assets comprises physical computing systems or virtual machines.

15. The apparatus of claim 11 wherein determining the first security action to be taken against the security incident in the first computing asset based on the rule set further comprises determining suggested security actions to be supplied to an administrator based on the rule set and a criticality rating for the first computing asset.

* * * * *